(12) United States Patent
Raghavan et al.

(10) Patent No.: US 11,751,228 B2
(45) Date of Patent: Sep. 5, 2023

(54) METHODS AND APPARATUSES FOR UPLINK SPATIAL RELATION INFO SWITCH

(71) Applicant: Intel Corporation, Santa Clara, CA (US)

(72) Inventors: Manasa Raghavan, Sunnyvale, CA (US); Qiming Li, Beijing (CN); Bishwarup Mondal, San Ramon, CA (US); Hua Li, Beijing (CN); Andrey Chervyakov, Nizhny Novgorod (RU)

(73) Assignee: Intel Corporation, Santa Clara, CA (US)

( * ) Notice: Subject to any disclaimer, the term of this patent is extended or adjusted under 35 U.S.C. 154(b) by 158 days.

(21) Appl. No.: 17/172,626

(22) Filed: Feb. 10, 2021

(65) Prior Publication Data

US 2021/0168813 A1 Jun. 3, 2021

Related U.S. Application Data

(60) Provisional application No. 62/975,085, filed on Feb. 11, 2020.

(51) Int. Cl.
*H04W 72/04* (2023.01)
*H04W 76/27* (2018.01)
(Continued)

(52) U.S. Cl.
CPC ......... *H04W 72/53* (2023.01); *H04L 25/0226* (2013.01); *H04W 72/046* (2013.01);
(Continued)

(58) Field of Classification Search
CPC ............. H04W 72/53; H04W 72/0446; H04W 72/046; H04W 72/23; H04W 76/27;
(Continued)

(56) References Cited

U.S. PATENT DOCUMENTS

2018/0041319 A1* 2/2018 Cheng ................... H04B 7/0695
2019/0379431 A1* 12/2019 Park ...................... H04B 7/0408
(Continued)

OTHER PUBLICATIONS

3GPP, "Technical Specification Group Radio Access Network; NR; Requirements for support of radio resource management (Release 16)," 3GPP TS 38.133 V16.2.0 (Dec. 2019), 5G, pp. 16-211.
(Continued)

*Primary Examiner* — Candal Elpenord
(74) *Attorney, Agent, or Firm* — Schwabe, Williamson & Wyatt, P.C.

(57) ABSTRACT

Various embodiments herein provide techniques for user equipment (UE) behavior and delay requirements in case of spatial relation information change for an uplink signal, such as a sounding reference signal (SRS), a physical uplink control channel (PUCCH), and/or a physical uplink shared channel (PUSCH). In one example, the UE determines a delay time period from receipt of a message that indicates spatial relation information for uplink transmission. The delay time period includes a decoding time period and a UE processing and preparation time period. The UE transmits an uplink signal using the indicated spatial relation information after expiration of the delay time period.

18 Claims, 7 Drawing Sheets

(51) Int. Cl.
 *H04L 25/02* (2006.01)
 *H04W 72/53* (2023.01)
 *H04W 72/0446* (2023.01)
 *H04W 72/044* (2023.01)
 *H04W 72/23* (2023.01)

(52) U.S. Cl.
 CPC ....... *H04W 72/0446* (2013.01); *H04W 72/23* (2023.01); *H04W 76/27* (2018.02)

(58) Field of Classification Search
 CPC ... H04L 25/0226; H04L 5/001; H04L 5/0048; H04L 5/0053; H04B 7/0617
 USPC .................................................. 370/329–330
 See application file for complete search history.

(56) References Cited

U.S. PATENT DOCUMENTS

| | | | | |
|---|---|---|---|---|
| 2020/0154467 | A1* | 5/2020 | Gong | H04W 24/08 |
| 2021/0391899 | A1* | 12/2021 | Cao | H04B 17/373 |
| 2021/0400649 | A1* | 12/2021 | Kang | H04B 7/0695 |
| 2022/0141786 | A1* | 5/2022 | Ruffini | H04W 56/0045 |
| | | | | 370/350 |
| 2022/0263557 | A1* | 8/2022 | Gonuguntla | H04B 7/0695 |
| 2022/0345195 | A1* | 10/2022 | Jang | H04B 7/0404 |

OTHER PUBLICATIONS

3GPP, "Technical Specification Group Radio Access Network; NR; Physical layer procedures for data (Release 16)," 3GPP TS 38.214 V16.0.0 (Dec. 2019), 5G, 147 pages.

\* cited by examiner

RRC based Spatial Relation Info switch

METHODS AND APPARATUSES FOR UPLINK SPATIAL RELATION INFO SWITCH

CROSS REFERENCE TO RELATED APPLICATION

The present application claims priority to U.S. Provisional Patent Application No. 62/975,085, which was filed Feb. 11, 2020, the disclosure of which are hereby incorporated by reference.

FIELD

Embodiments relate generally to the technical field of wireless communications.

BACKGROUND

In New Radio (NR), the transmission (Tx) beam for uplink channels such as sounding reference signal (SRS), physical uplink control channel (PUCCH), and physical uplink shared channel (PUSCH) may be indicated by a SpatialRelationInfo parameter. The spatial relation info indicates that the same spatial filter or Tx beam should be used for the transmission of the uplink (UL) resource as a downlink (DL) or UL reference signal (RS).

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Figure 1:
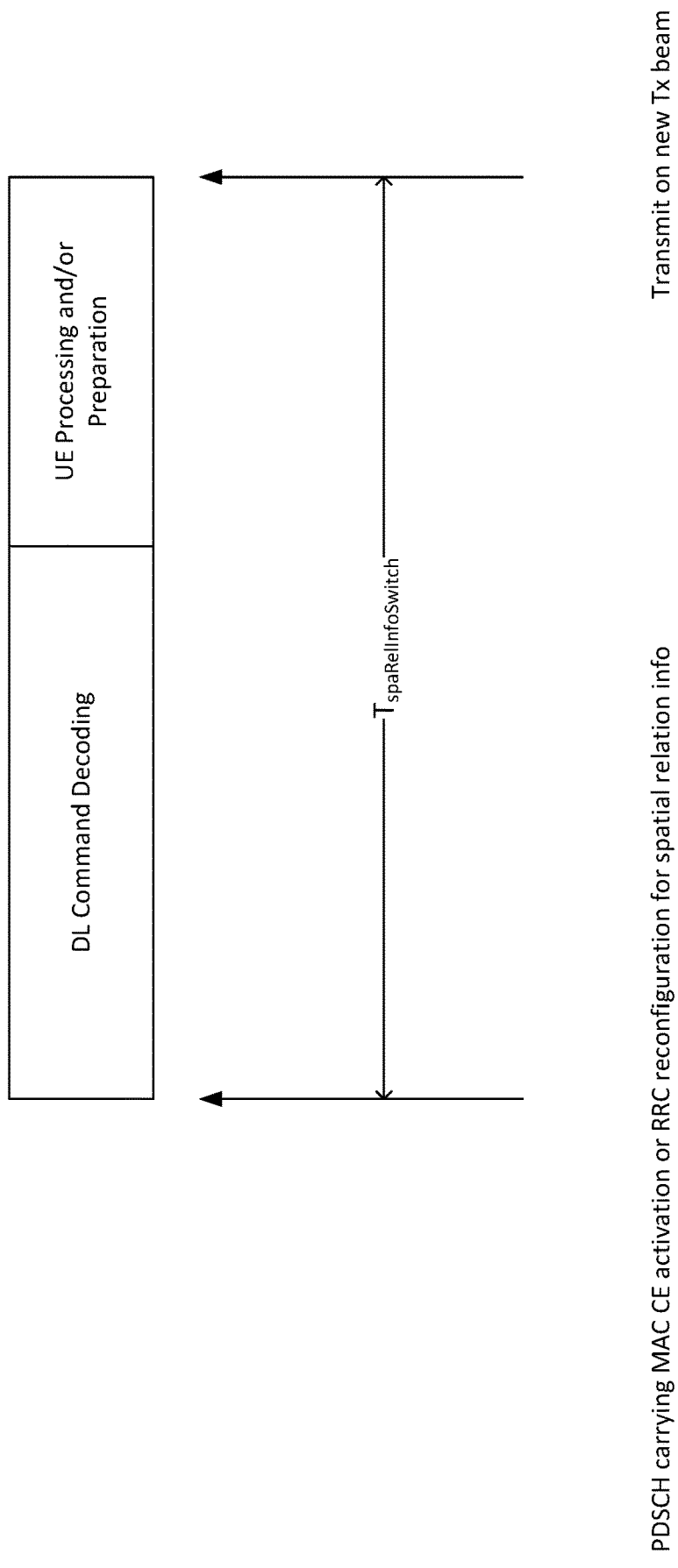
FIG. 1 schematically illustrates a delay between a time when a user equipment (UE) receives a physical downlink shared channel (PDSCH) carrying a medium access control (MAC) control element (CE) or radio resource control (RRC) reconfiguration for spatial relation information and a time when the UE is expected to transmit on a new Tx beam, in accordance with various embodiments.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrases "A or B" and "A/B" mean (A), (B), or (A and B).

Various embodiments herein provide techniques for user equipment (UE) behavior and delay requirements in case of spatial relation information change for an uplink signal, such as a physical uplink control channel (PUCCH), a physical uplink shared channel (PUSCH), and/or a sounding reference signal (SRS).

As discussed above, in New Radio (NR), the transmission (Tx) beam for uplink channels such as SRS, PUCCH, and PUSCH may be indicated by a SpatialRelationInfo parameter. The spatial relation info indicates that the same spatial filter or Tx beam should be used for the transmission of the uplink (UL) resource as a downlink (DL) or UL reference signal (RS).

For SRS, the spatial relation is specified using the parameter SRS-SpatialRelationInfo in the SRS-Resource information element (IE), e.g., as shown below.

```
SRS-SpatialRelationInfo ::=            SEQUENCE {
    servingCellId                      ServCellIndex
OPTIONAL, -- Need S
    referenceSignal                    CHOICE {
        ssb-Index                      SSB-Index,
        csi-RS-Index                   NZP-CSI-RS-ResourceId,
        srs                            SEQUENCE {
            resourceId                     SRS-ResourceId,
            uplinkBWP                      BWP-Id
        }
    }
}
```

For Semi-Persistent SRS (SP-SRS), a medium access control (MAC)-control element (CE) may be used to specify the spatial relation info.

For PUCCH, the spatial relation is specified by IE PUCCH-SpatialRelationInfo, e.g., as shown below.

```
PUCCH-SpatialRelationInfo ::=          SEQUENCE {
    pucch-SpatialRelationInfoId        PUCCH-SpatialRelationInfoId,
    servingCellId                      ServCellIndex
OPTIONAL, -- Need S
    referenceSignal                    CHOICE {
        ssb-Index                      SSB-Index,
        csi-RS-Index                   NZP-CSI-RS-ResourceId,
```

```
        srs                      SEQUENCE {
                                   resource         SRS-ResourceId,
                                   uplinkBWP          BWP-Id
                                 }
      },
      pucch-PathlossReferenceRS-Id           PUCCH-PathlossReferenceRS-Id,
      p0-PUCCH-Id                            P0-PUCCH-Id,
      closedLoopIndex                        ENUMERATED { i0, i1 }
    }
```

In case more than 1 resource is specified for spatial relation for PUCCH in spatialRelationInfoToAddModList, then MAC CE is used to activate the spatial relation info for the PUCCH resource.

For PUSCH configured with downlink control information (DCI) format 0_0, the Tx beam is based on the PUCCH resource with lowest resource identifier (ID). For PUSCH scheduled using DCI format 0_1, the spatial relation is given by a SRS resource indicator (SRI).

The Tx beam for an uplink transmission may be associated with a DL RS (e.g., synchronization signal/physical broadcast channel (SS/PBCH) or channel state information (CSI)-RS) or an UL resource (e.g., SRS).

The spatial relation for the uplink resource for SRS or PUCCH may be changed via radio resource control (RRC) reconfiguration or via MAC CE. However, the delay requirements and UE behavior in case of a spatial relation info switch are not specified. Additionally, the UE behavior when configured with spatial relation info in certain conditions is not specified.

With the UE behavior and delay requirements unspecified, the network might not know when to expect transmission from the UE on the specified Tx beam and might result in missed transmission and non-optimal usage of resources.

Various embodiments herein provide the UE behavior and/or delay requirements in case of spatial relation info change for an uplink signal, such as PUCCH and/or SRS.

Transmitting with Configured Spatial Relation Info

In various embodiments, the spatial relation info may be configured via RRC, MAC CE, and/or DCI (e.g., the DCI scheduling the transmission). The spatial relation for the uplink transmission may be based on a DL RS or SRS. In case the Tx beam for UL transmission is based on DL RS, the transmission configuration indicator (TCI) state for that RS should be known to the UE in order to transmit PUCCH or SRS or PUSCH in the scheduled slot. When the TCI state of the DL RS is known, the Rx beam for receiving the DL RS is known to the UE without additional measurements. The definition of known TCI state is given in 3GPP Technical Standard (TS) 38.133, V16.2.0, Section 8.10.2. In case the TCI state of the DL RS that is indicating the spatial relation info for the uplink resource is unknown, then additional time shall be needed to determine the suitable Rx beam for the DL RS to be used for the uplink transmission.

Accordingly, when spatial relation info for an uplink resource (e.g., for SRS PUSCH, or PUCCH) is based on a DL RS, the TCI state of the DL RS could be known or unknown to the UE. When TCI state of the DL RS is known, the UE may transmit the uplink signal (e.g., SRS, PUCCH, or PUSCH) with the same spatial filter as receiving the DL RS in the scheduled slot.

When TCI state of the DL RS is unknown, the UE behavior may be one of the following:
 (a) Transmit the uplink signal with the Tx beam that was associated with the DL RS.
 (b) Transmit the uplink signal with an arbitrary Tx beam.
 (c) Drop current transmission of the uplink signal, perform required measurements to determine the suitable Rx beam for the DL RS, and transmit the uplink signal with the same spatial filter as the DL RS when scheduled again or at next occasion.

In various embodiments, when the spatial relation for the uplink resource (e.g., for SRS, PUCCH, or PUSCH) is based on an SRS resource, the UE transmits the uplink signal using the same spatial filter as the SRS. In case the UE does not know the spatial filter or Tx beam associated with the SRS, the UE may transmit on an arbitrary beam.

Spatial Relation Info Switch

FIG. 1 illustrates example components of delay in spatial relation info switch. As shown, after receiving a PDSCH carrying a MAC CE or RRC command for spatial relation info switch, there is a delay before the UE can transmit with the new Tx beam. The delay components may include DL command decoding time and/or UE processing and/or preparation time. The DL command decoding time may be MAC CE decoding time and/or RRC processing delay (e.g., based on the type of switch command). When the spatial relation info switch is associated with a DL RS, the UE processing time may include time for Rx beam tracking and/or time tracking based on the TCI state of the DL RS. The processing and preparation time may additionally or alternatively include one or more other delays, e.g., as specified in 3GPP TS 38.214, V16.0.0. In embodiments, when the spatial relation info switch command for an uplink signal is received by the UE, the UE shall transmit the uplink signal with the new Tx beam after the delay.

In various embodiments, the UE shall be able to transmit UL resource on old Tx beam at least until the decoding of DL command carrying spatial relation info switch.

Figure 2:
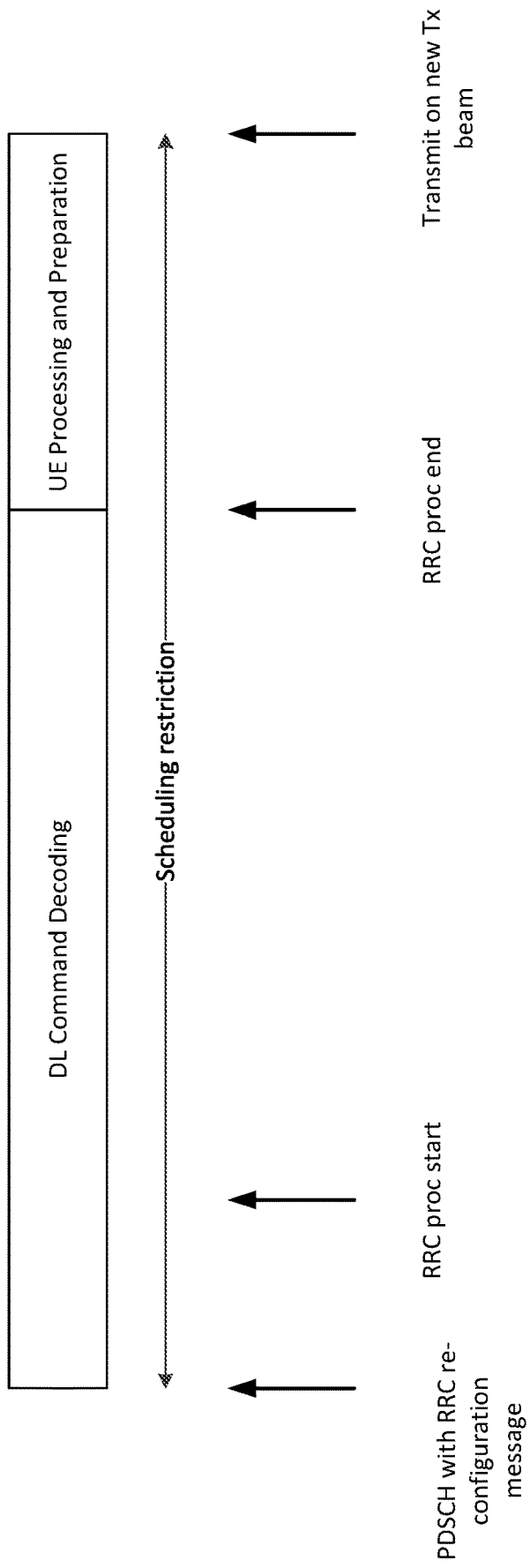
FIG. 2 schematically illustrates a delay between a time when a UE receives a PDSCH with a RRC reconfiguration message and a time when the UE is expected to transmit on a new Tx beam, in accordance with various embodiments.

In some embodiments, in case of RRC reconfiguration for spatial relation info switch, the UE shall have a scheduling restriction during the entire switching period. Accordingly, the gNB may not schedule the UE for transmission of a SRS, PUCCH, PUSCH, and/or other uplink signal during the switching period. FIG. 2 illustrates an example of the switching period for RRC reconfiguration.

Systems and Implementations

Figure 3:
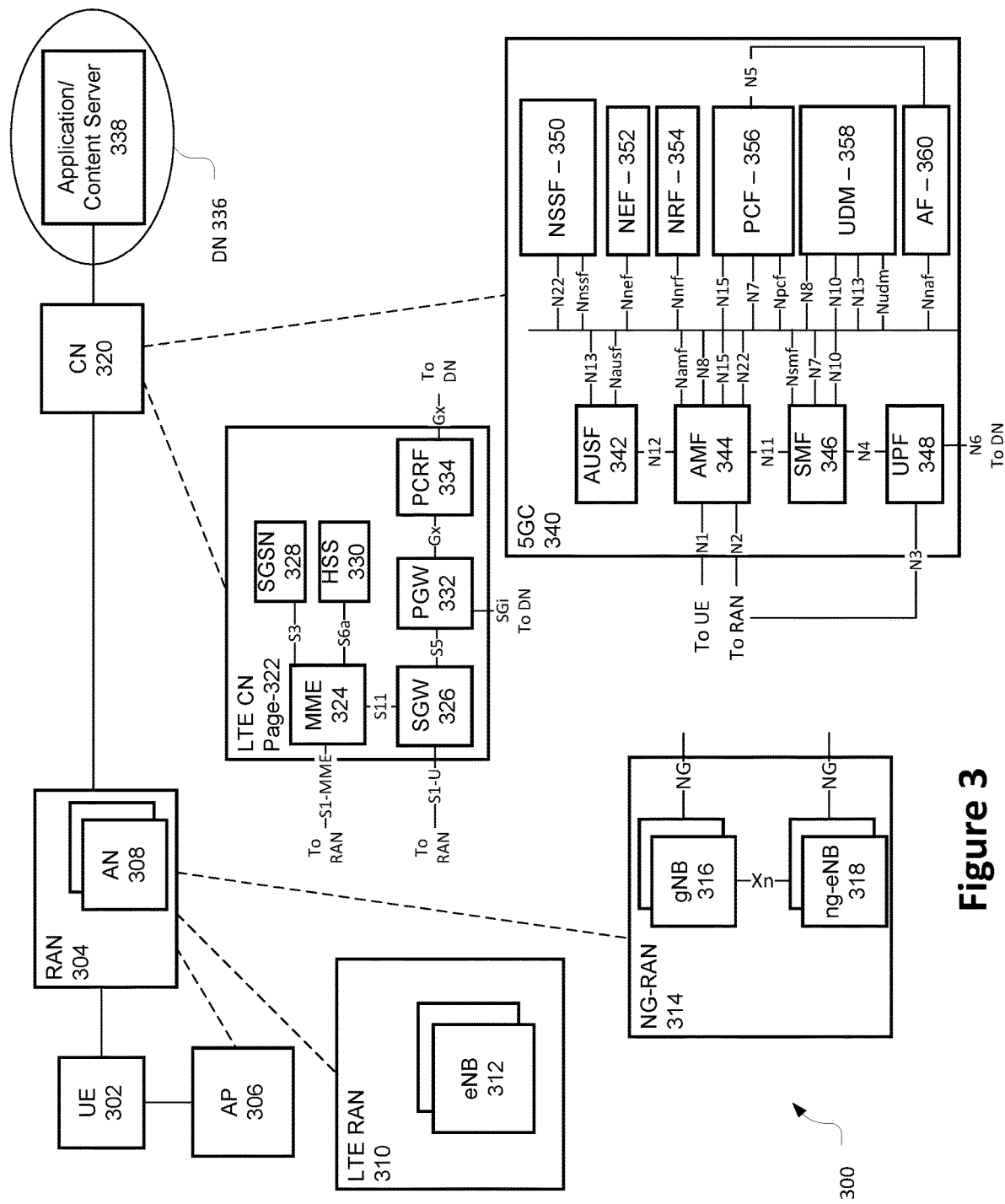
FIG. 3 schematically illustrates a wireless network in accordance with various embodiments.
Figure 4:
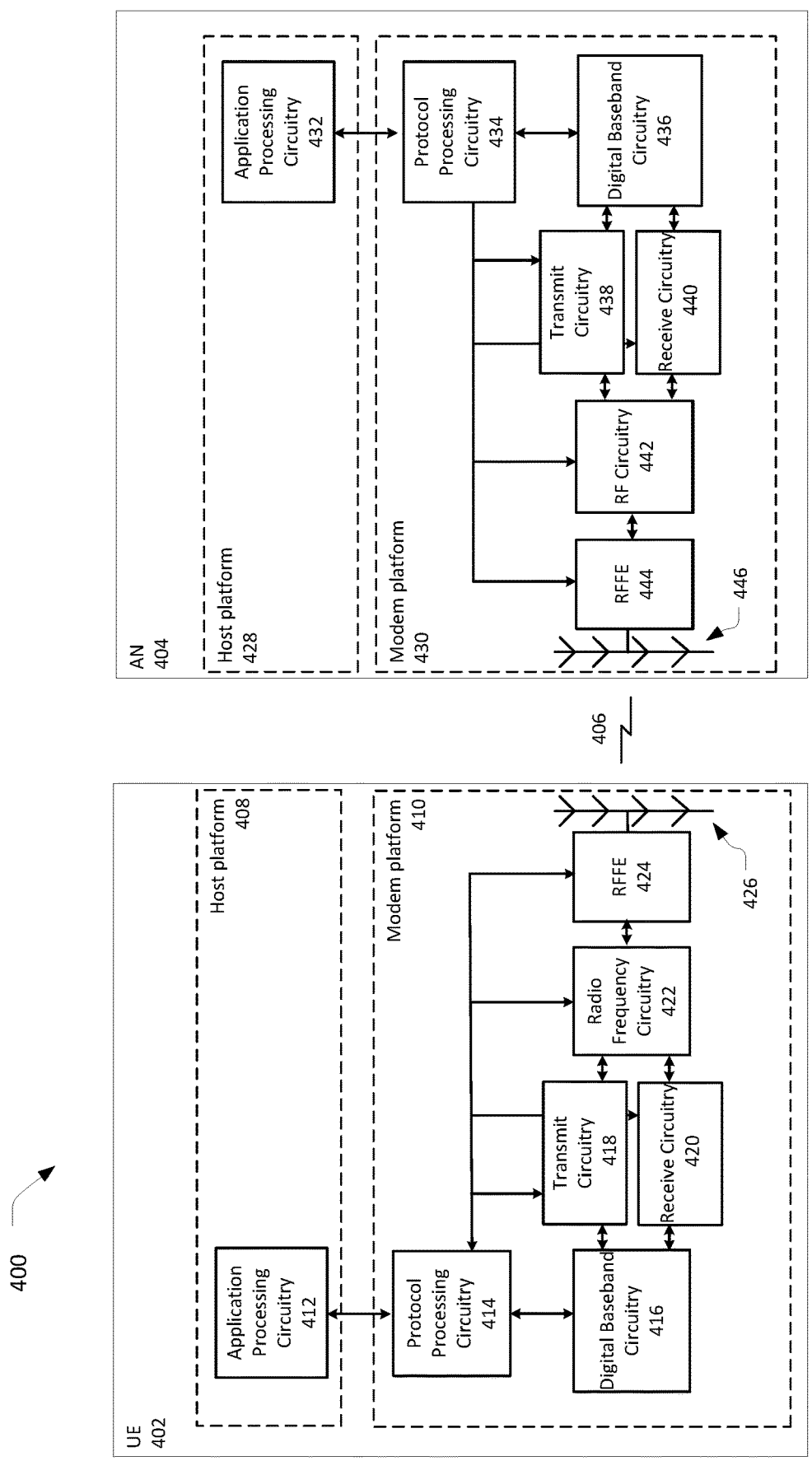
FIG. 4 schematically illustrates components of a wireless network in accordance with various embodiments.
Figure 5:
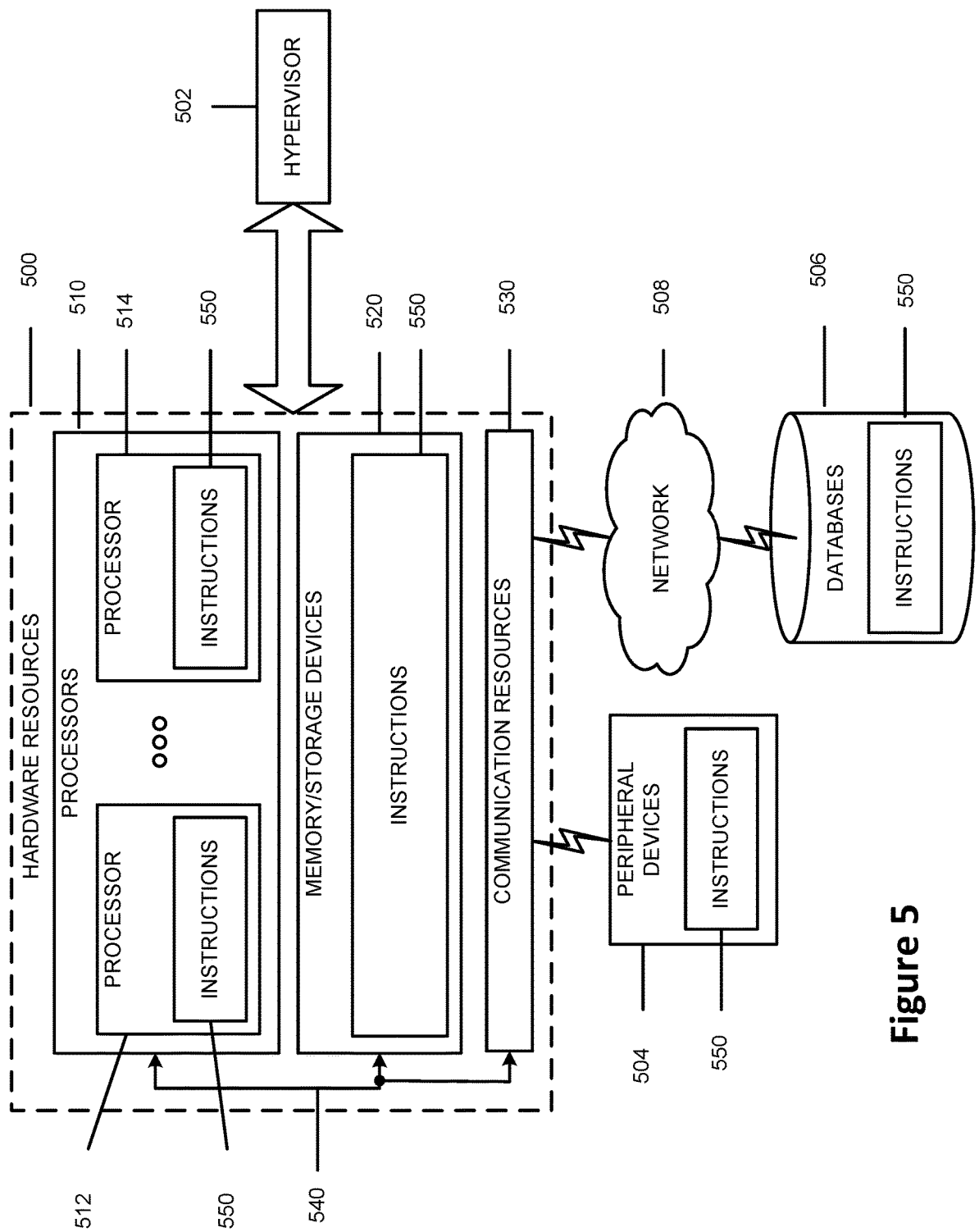
FIG. 5 is a block diagram illustrating components, according to some example embodiments, able to read instructions from a machine-readable or computer-readable medium (e.g., a non-transitory machine-readable storage medium) and perform any one or more of the methodologies discussed herein.

FIGS. 3-5 illustrate various systems, device, and components that may implement aspects of disclosed embodiments.

FIG. 3 illustrates a network 300 in accordance with various embodiments. The network 300 may operate in a manner consistent with 3GPP technical specifications for LTE or 5G/NR systems. However, the example embodiments are not limited in this regard and the described embodiments may apply to other networks that benefit from the principles described herein, such as future 3GPP systems, or the like.

The network 300 may include a UE 302, which may include any mobile or non-mobile computing device designed to communicate with a RAN 304 via an over-the-air connection. The UE 302 may be, but is not limited to, a smartphone, tablet computer, wearable computer device, desktop computer, laptop computer, in-vehicle infotainment, in-car entertainment device, instrument cluster, head-up display device, onboard diagnostic device, dashtop mobile equipment, mobile data terminal, electronic engine management system, electronic/engine control unit, electronic/engine control module, embedded system, sensor, microcontroller, control module, engine management system, networked appliance, machine-type communication device, M2M or D2D device, IoT device, etc.

In some embodiments, the network 300 may include a plurality of UEs coupled directly with one another via a sidelink interface. The UEs may be M2M/D2D devices that communicate using physical sidelink channels such as, but not limited to, PSBCH, PSDCH, PSSCH, PSCCH, PSFCH, etc.

In some embodiments, the UE 302 may additionally communicate with an AP 306 via an over-the-air connection. The AP 306 may manage a WLAN connection, which may serve to offload some/all network traffic from the RAN 304. The connection between the UE 302 and the AP 306 may be consistent with any IEEE 802.11 protocol, wherein the AP 306 could be a wireless fidelity (Wi-Fi®) router. In some embodiments, the UE 302, RAN 304, and AP 306 may utilize cellular-WLAN aggregation (for example, LWA/LWIP). Cellular-WLAN aggregation may involve the UE 302 being configured by the RAN 304 to utilize both cellular radio resources and WLAN resources.

The RAN 304 may include one or more access nodes, for example, AN 308. AN 308 may terminate air-interface protocols for the UE 302 by providing access stratum protocols including RRC, PDCP, RLC, MAC, and L1 protocols. In this manner, the AN 308 may enable data/voice connectivity between CN 320 and the UE 302. In some embodiments, the AN 308 may be implemented in a discrete device or as one or more software entities running on server computers as part of, for example, a virtual network, which may be referred to as a CRAN or virtual baseband unit pool. The AN 308 be referred to as a BS, gNB, RAN node, eNB, ng-eNB, NodeB, RSU, TRxP, TRP, etc. The AN 308 may be a macrocell base station or a low power base station for providing femtocells, picocells or other like cells having smaller coverage areas, smaller user capacity, or higher bandwidth compared to macrocells.

In embodiments in which the RAN 304 includes a plurality of ANs, they may be coupled with one another via an X2 interface (if the RAN 304 is an LTE RAN) or an Xn interface (if the RAN 304 is a 5G RAN). The X2/Xn interfaces, which may be separated into control/user plane interfaces in some embodiments, may allow the ANs to communicate information related to handovers, data/context transfers, mobility, load management, interference coordination, etc.

The ANs of the RAN 304 may each manage one or more cells, cell groups, component carriers, etc. to provide the UE 302 with an air interface for network access. The UE 302 may be simultaneously connected with a plurality of cells provided by the same or different ANs of the RAN 304. For example, the UE 302 and RAN 304 may use carrier aggregation to allow the UE 302 to connect with a plurality of component carriers, each corresponding to a Pcell or Scell. In dual connectivity scenarios, a first AN may be a master node that provides an MCG and a second AN may be secondary node that provides an SCG. The first/second ANs may be any combination of eNB, gNB, ng-eNB, etc.

The RAN 304 may provide the air interface over a licensed spectrum or an unlicensed spectrum. To operate in the unlicensed spectrum, the nodes may use LAA, eLAA, and/or feLAA mechanisms based on CA technology with PCells/Scells. Prior to accessing the unlicensed spectrum, the nodes may perform medium/carrier-sensing operations based on, for example, a listen-before-talk (LBT) protocol.

In V2X scenarios the UE 302 or AN 308 may be or act as a RSU, which may refer to any transportation infrastructure entity used for V2X communications. An RSU may be implemented in or by a suitable AN or a stationary (or relatively stationary) UE. An RSU implemented in or by: a UE may be referred to as a "UE-type RSU"; an eNB may be referred to as an "eNB-type RSU"; a gNB may be referred to as a "gNB-type RSU"; and the like. In one example, an RSU is a computing device coupled with radio frequency circuitry located on a roadside that provides connectivity support to passing vehicle UEs. The RSU may also include internal data storage circuitry to store intersection map geometry, traffic statistics, media, as well as applications/software to sense and control ongoing vehicular and pedestrian traffic. The RSU may provide very low latency communications required for high speed events, such as crash avoidance, traffic warnings, and the like. Additionally or alternatively, the RSU may provide other cellular/WLAN communications services. The components of the RSU may be packaged in a weatherproof enclosure suitable for outdoor installation, and may include a network interface controller to provide a wired connection (e.g., Ethernet) to a traffic signal controller or a backhaul network.

In some embodiments, the RAN 304 may be an LTE RAN 310 with eNBs, for example, eNB 312. The LTE RAN 310 may provide an LTE air interface with the following characteristics: SCS of 15 kHz; CP-OFDM waveform for DL and SC-FDMA waveform for UL; turbo codes for data and TBCC for control; etc. The LTE air interface may rely on CSI-RS for CSI acquisition and beam management; PDSCH/PDCCH DMRS for PDSCH/PDCCH demodulation; and CRS for cell search and initial acquisition, channel quality measurements, and channel estimation for coherent demodulation/detection at the UE. The LTE air interface may operating on sub-6 GHz bands.

In some embodiments, the RAN 304 may be an NG-RAN 314 with gNBs, for example, gNB 316, or ng-eNBs, for example, ng-eNB 318. The gNB 316 may connect with 5G-enabled UEs using a 5G NR interface. The gNB 316 may connect with a 5G core through an NG interface, which may include an N2 interface or an N3 interface. The ng-eNB 318 may also connect with the 5G core through an NG interface, but may connect with a UE via an LTE air interface. The gNB 316 and the ng-eNB 318 may connect with each other over an Xn interface.

In some embodiments, the NG interface may be split into two parts, an NG user plane (NG-U) interface, which carries traffic data between the nodes of the NG-RAN 314 and a UPF 348 (e.g., N3 interface), and an NG control plane (NG-C) interface, which is a signaling interface between the nodes of the NG-RAN 314 and an AMF 344 (e.g., N2 interface).

The NG-RAN 314 may provide a 5G-NR air interface with the following characteristics: variable SCS; CP-OFDM for DL, CP-OFDM and DFT-s-OFDM for UL; polar, repetition, simplex, and Reed-Muller codes for control and LDPC for data. The 5G-NR air interface may rely on CSI-RS, PDSCH/PDCCH DMRS similar to the LTE air interface. The 5G-NR air interface may not use a CRS, but may use PBCH DMRS for PBCH demodulation; PTRS for phase tracking for PDSCH; and tracking reference signal for time tracking. The 5G-NR air interface may operating on FR1 bands that include sub-6 GHz bands or FR2 bands that include bands from 24.25 GHz to 52.6 GHz. The 5G-NR air interface may include an SSB that is an area of a downlink resource grid that includes PSS/SSS/PBCH.

In some embodiments, the 5G-NR air interface may utilize BWPs for various purposes. For example, BWP can be used for dynamic adaptation of the SCS. For example, the UE 302 can be configured with multiple BWPs where each BWP configuration has a different SCS. When a BWP change is indicated to the UE 302, the SCS of the transmission is changed as well. Another use case example of BWP is related to power saving. In particular, multiple BWPs can be configured for the UE 302 with different amount of frequency resources (for example, PRBs) to support data transmission under different traffic loading scenarios. A BWP containing a smaller number of PRBs can be used for data transmission with small traffic load while allowing power saving at the UE 302 and in some cases at the gNB 316. A BWP containing a larger number of PRBs can be used for scenarios with higher traffic load.

The RAN 304 is communicatively coupled to CN 320 that includes network elements to provide various functions to support data and telecommunications services to customers/subscribers (for example, users of UE 302). The components of the CN 320 may be implemented in one physical node or separate physical nodes. In some embodiments, NFV may be utilized to virtualize any or all of the functions provided by the network elements of the CN 320 onto physical compute/storage resources in servers, switches, etc. A logical instantiation of the CN 320 may be referred to as a network slice, and a logical instantiation of a portion of the CN 320 may be referred to as a network sub-slice.

In some embodiments, the CN 320 may be an LTE CN 322, which may also be referred to as an EPC. The LTE CN 322 may include MME 324, SGW 326, SGSN 328, HSS 330, PGW 332, and PCRF 334 coupled with one another over interfaces (or "reference points") as shown. Functions of the elements of the LTE CN 322 may be briefly introduced as follows.

The MME 324 may implement mobility management functions to track a current location of the UE 302 to facilitate paging, bearer activation/deactivation, handovers, gateway selection, authentication, etc.

The SGW 326 may terminate an Si interface toward the RAN and route data packets between the RAN and the LTE CN 322. The SGW 326 may be a local mobility anchor point for inter-RAN node handovers and also may provide an anchor for inter-3GPP mobility. Other responsibilities may include lawful intercept, charging, and some policy enforcement.

The SGSN 328 may track a location of the UE 302 and perform security functions and access control. In addition, the SGSN 328 may perform inter-EPC node signaling for mobility between different RAT networks; PDN and S-GW selection as specified by MME 324; MME selection for handovers; etc. The S3 reference point between the MME 324 and the SGSN 328 may enable user and bearer information exchange for inter-3GPP access network mobility in idle/active states.

The HSS 330 may include a database for network users, including subscription-related information to support the network entities' handling of communication sessions. The HSS 330 can provide support for routing/roaming, authentication, authorization, naming/addressing resolution, location dependencies, etc. An S6a reference point between the HSS 330 and the MME 324 may enable transfer of subscription and authentication data for authenticating/authorizing user access to the LTE CN 320.

The PGW 332 may terminate an SGi interface toward a data network (DN) 336 that may include an application/content server 338. The PGW 332 may route data packets between the LTE CN 322 and the data network 336. The PGW 332 may be coupled with the SGW 326 by an S5 reference point to facilitate user plane tunneling and tunnel management. The PGW 332 may further include a node for policy enforcement and charging data collection (for example, PCEF). Additionally, the SGi reference point between the PGW 332 and the data network 336 may be an operator external public, a private PDN, or an intra-operator packet data network, for example, for provision of IMS services. The PGW 332 may be coupled with a PCRF 334 via a Gx reference point.

The PCRF 334 is the policy and charging control element of the LTE CN 322. The PCRF 334 may be communicatively coupled to the app/content server 338 to determine appropriate QoS and charging parameters for service flows. The PCRF 332 may provision associated rules into a PCEF (via Gx reference point) with appropriate TFT and QCI.

In some embodiments, the CN 320 may be a 5GC 340. The 5GC 340 may include an AUSF 342, AMF 344, SMF 346, UPF 348, NSSF 350, NEF 352, NRF 354, PCF 356, UDM 358, and AF 360 coupled with one another over interfaces (or "reference points") as shown. Functions of the elements of the 5GC 340 may be briefly introduced as follows.

The AUSF 342 may store data for authentication of UE 302 and handle authentication-related functionality. The AUSF 342 may facilitate a common authentication framework for various access types. In addition to communicating with other elements of the 5GC 340 over reference points as shown, the AUSF 342 may exhibit an Nausf service-based interface.

The AMF 344 may allow other functions of the 5GC 340 to communicate with the UE 302 and the RAN 304 and to subscribe to notifications about mobility events with respect to the UE 302. The AMF 344 may be responsible for registration management (for example, for registering UE 302), connection management, reachability management, mobility management, lawful interception of AMF-related events, and access authentication and authorization. The AMF 344 may provide transport for SM messages between the UE 302 and the SMF 346, and act as a transparent proxy for routing SM messages. AMF 344 may also provide transport for SMS messages between UE 302 and an SMSF. AMF 344 may interact with the AUSF 342 and the UE 302 to perform various security anchor and context management functions. Furthermore, AMF 344 may be a termination point of a RAN CP interface, which may include or be an N2 reference point between the RAN 304 and the AMF 344; and the AMF 344 may be a termination point of NAS (N1) signaling, and perform NAS ciphering and integrity protection. AMF 344 may also support NAS signaling with the UE 302 over an N3 IWF interface.

The SMF 346 may be responsible for SM (for example, session establishment, tunnel management between UPF 348 and AN 308); UE IP address allocation and management (including optional authorization); selection and control of UP function; configuring traffic steering at UPF 348 to route traffic to proper destination; termination of interfaces toward policy control functions; controlling part of policy enforcement, charging, and QoS; lawful intercept (for SM events and interface to LI system); termination of SM parts of NAS messages; downlink data notification; initiating AN specific SM information, sent via AMF 344 over N2 to AN 308; and determining SSC mode of a session. SM may refer to management of a PDU session, and a PDU session or "session" may refer to a PDU connectivity service that provides or enables the exchange of PDUs between the UE 302 and the data network 336.

The UPF 348 may act as an anchor point for intra-RAT and inter-RAT mobility, an external PDU session point of interconnect to data network 336, and a branching point to support multi-homed PDU session. The UPF 348 may also perform packet routing and forwarding, perform packet inspection, enforce the user plane part of policy rules, lawfully intercept packets (UP collection), perform traffic usage reporting, perform QoS handling for a user plane (e.g., packet filtering, gating, UL/DL rate enforcement), perform uplink traffic verification (e.g., SDF-to-QoS flow mapping), transport level packet marking in the uplink and downlink, and perform downlink packet buffering and downlink data notification triggering. UPF 348 may include an uplink classifier to support routing traffic flows to a data network.

The NSSF 350 may select a set of network slice instances serving the UE 302. The NSSF 350 may also determine allowed NSSAI and the mapping to the subscribed S-NS-SAIs, if needed. The NSSF 350 may also determine the AMF set to be used to serve the UE 302, or a list of candidate AMFs based on a suitable configuration and possibly by querying the NRF 354. The selection of a set of network slice instances for the UE 302 may be triggered by the AMF 344 with which the UE 302 is registered by interacting with the NSSF 350, which may lead to a change of AMF. The NSSF 350 may interact with the AMF 344 via an N22 reference point; and may communicate with another NSSF in a visited network via an N31 reference point (not shown). Additionally, the NSSF 350 may exhibit an Nnssf service-based interface.

The NEF 352 may securely expose services and capabilities provided by 3GPP network functions for third party, internal exposure/re-exposure, AFs (e.g., AF 360), edge computing or fog computing systems, etc. In such embodiments, the NEF 352 may authenticate, authorize, or throttle the AFs. NEF 352 may also translate information exchanged with the AF 360 and information exchanged with internal network functions. For example, the NEF 352 may translate between an AF-Service-Identifier and an internal 5GC information. NEF 352 may also receive information from other NFs based on exposed capabilities of other NFs. This information may be stored at the NEF 352 as structured data, or at a data storage NF using standardized interfaces. The stored information can then be re-exposed by the NEF 352 to other NFs and AFs, or used for other purposes such as analytics. Additionally, the NEF 352 may exhibit an Nnef service-based interface.

The NRF 354 may support service discovery functions, receive NF discovery requests from NF instances, and provide the information of the discovered NF instances to the NF instances. NRF 354 also maintains information of available NF instances and their supported services. As used herein, the terms "instantiate," "instantiation," and the like may refer to the creation of an instance, and an "instance" may refer to a concrete occurrence of an object, which may occur, for example, during execution of program code. Additionally, the NRF 354 may exhibit the Nnrf service-based interface.

The PCF 356 may provide policy rules to control plane functions to enforce them, and may also support unified policy framework to govern network behavior. The PCF 356 may also implement a front end to access subscription information relevant for policy decisions in a UDR of the UDM 358. In addition to communicating with functions over reference points as shown, the PCF 356 exhibit an Npcf service-based interface.

The UDM 358 may handle subscription-related information to support the network entities' handling of communication sessions, and may store subscription data of UE 302. For example, subscription data may be communicated via an N8 reference point between the UDM 358 and the AMF 344. The UDM 358 may include two parts, an application front end and a UDR. The UDR may store subscription data and policy data for the UDM 358 and the PCF 356, and/or structured data for exposure and application data (including PFDs for application detection, application request information for multiple UEs 302) for the NEF 352. The Nudr service-based interface may be exhibited by the UDR 221 to allow the UDM 358, PCF 356, and NEF 352 to access a particular set of the stored data, as well as to read, update (e.g., add, modify), delete, and subscribe to notification of relevant data changes in the UDR. The UDM may include a UDM-FE, which is in charge of processing credentials, location management, subscription management and so on. Several different front ends may serve the same user in different transactions. The UDM-FE accesses subscription information stored in the UDR and performs authentication credential processing, user identification handling, access authorization, registration/mobility management, and subscription management. In addition to communicating with other NFs over reference points as shown, the UDM 358 may exhibit the Nudm service-based interface.

The AF 360 may provide application influence on traffic routing, provide access to NEF, and interact with the policy framework for policy control.

In some embodiments, the 5GC 340 may enable edge computing by selecting operator/3rd party services to be geographically close to a point that the UE 302 is attached to the network. This may reduce latency and load on the network. To provide edge-computing implementations, the 5GC 340 may select a UPF 348 close to the UE 302 and execute traffic steering from the UPF 348 to data network 336 via the N6 interface. This may be based on the UE subscription data, UE location, and information provided by the AF 360. In this way, the AF 360 may influence UPF (re)selection and traffic routing. Based on operator deployment, when AF 360 is considered to be a trusted entity, the network operator may permit AF 360 to interact directly with relevant NFs. Additionally, the AF 360 may exhibit an Naf service-based interface.

The data network 336 may represent various network operator services, Internet access, or third party services that may be provided by one or more servers including, for example, application/content server 338.

FIG. 4 schematically illustrates a wireless network 400 in accordance with various embodiments. The wireless network 400 may include a UE 402 in wireless communication with an AN 404. The UE 402 and AN 404 may be similar to, and substantially interchangeable with, like-named components described elsewhere herein.

The UE 402 may be communicatively coupled with the AN 404 via connection 406.

The connection 406 is illustrated as an air interface to enable communicative coupling, and can be consistent with cellular communications protocols such as an LTE protocol or a 5G NR protocol operating at mmWave or sub-6 GHz frequencies.

The UE 402 may include a host platform 408 coupled with a modem platform 410. The host platform 408 may include application processing circuitry 412, which may be coupled with protocol processing circuitry 414 of the modem platform 410. The application processing circuitry 412 may run various applications for the UE 402 that source/sink application data. The application processing circuitry 412 may further implement one or more layer operations to transmit/receive application data to/from a data network. These layer operations may include transport (for example UDP) and Internet (for example, IP) operations The protocol processing circuitry 414 may implement one or more of layer operations to facilitate transmission or reception of data over the connection 406. The layer operations implemented by the protocol processing circuitry 414 may include, for example, MAC, RLC, PDCP, RRC and NAS operations.

The modem platform 410 may further include digital baseband circuitry 416 that may implement one or more layer operations that are "below" layer operations performed by the protocol processing circuitry 414 in a network protocol stack. These operations may include, for example, PHY operations including one or more of HARQ-ACK functions, scrambling/descrambling, encoding/decoding, layer mapping/de-mapping, modulation symbol mapping, received symbol/bit metric determination, multi-antenna port precoding/decoding, which may include one or more of space-time, space-frequency or spatial coding, reference signal generation/detection, preamble sequence generation and/or decoding, synchronization sequence generation/detection, control channel signal blind decoding, and other related functions.

The modem platform 410 may further include transmit circuitry 418, receive circuitry 420, RF circuitry 422, and RF front end (RFFE) 424, which may include or connect to one or more antenna panels 426. Briefly, the transmit circuitry 418 may include a digital-to-analog converter, mixer, intermediate frequency (IF) components, etc.; the receive circuitry 420 may include an analog-to-digital converter, mixer, IF components, etc.; the RF circuitry 422 may include a low-noise amplifier, a power amplifier, power tracking components, etc.; RFFE 424 may include filters (for example, surface/bulk acoustic wave filters), switches, antenna tuners, beamforming components (for example, phase-array antenna components), etc. The selection and arrangement of the components of the transmit circuitry 418, receive circuitry 420, RF circuitry 422, RFFE 424, and antenna panels 426 (referred generically as "transmit/receive components") may be specific to details of a specific implementation such as, for example, whether communication is TDM or FDM, in mmWave or sub-6 gHz frequencies, etc. In some embodiments, the transmit/receive components may be arranged in multiple parallel transmit/receive chains, may be disposed in the same or different chips/modules, etc.

In some embodiments, the protocol processing circuitry 414 may include one or more instances of control circuitry (not shown) to provide control functions for the transmit/receive components.

A UE reception may be established by and via the antenna panels 426, RFFE 424, RF circuitry 422, receive circuitry 420, digital baseband circuitry 416, and protocol processing circuitry 414. In some embodiments, the antenna panels 426 may receive a transmission from the AN 404 by receive-beamforming signals received by a plurality of antennas/antenna elements of the one or more antenna panels 426.

A UE transmission may be established by and via the protocol processing circuitry 414, digital baseband circuitry 416, transmit circuitry 418, RF circuitry 422, RFFE 424, and antenna panels 426. In some embodiments, the transmit components of the UE 404 may apply a spatial filter to the data to be transmitted to form a transmit beam emitted by the antenna elements of the antenna panels 426.

Similar to the UE 402, the AN 404 may include a host platform 428 coupled with a modem platform 430. The host platform 428 may include application processing circuitry 432 coupled with protocol processing circuitry 434 of the modem platform 430. The modem platform may further include digital baseband circuitry 436, transmit circuitry 438, receive circuitry 440, RF circuitry 442, RFFE circuitry 444, and antenna panels 446. The components of the AN 404 may be similar to and substantially interchangeable with like-named components of the UE 402. In addition to performing data transmission/reception as described above, the components of the AN 408 may perform various logical functions that include, for example, RNC functions such as radio bearer management, uplink and downlink dynamic radio resource management, and data packet scheduling.

FIG. 5 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 5 shows a diagrammatic representation of hardware resources 500 including one or more processors (or processor cores) 510, one or more memory/storage devices 520, and one or more communication resources 530, each of which may be communicatively coupled via a bus 540 or other interface circuitry. For embodiments where node virtualization (e.g., NFV) is utilized, a hypervisor 502 may be executed to provide an execution environment for one or more network slices/sub-slices to utilize the hardware resources 500.

The processors 510 may include, for example, a processor 512 and a processor 514. The processors 510 may be, for example, a central processing unit (CPU), a reduced instruction set computing (RISC) processor, a complex instruction set computing (CISC) processor, a graphics processing unit (GPU), a DSP such as a baseband processor, an ASIC, an FPGA, a radiofrequency integrated circuit (RFIC), another processor (including those discussed herein), or any suitable combination thereof.

The memory/storage devices 520 may include main memory, disk storage, or any suitable combination thereof. The memory/storage devices 520 may include, but are not limited to, any type of volatile, non-volatile, or semi-volatile memory such as dynamic random access memory (DRAM), static random access memory (SRAM), erasable programmable read-only memory (EPROM), electrically erasable programmable read-only memory (EEPROM), Flash memory, solid-state storage, etc.

The communication resources 530 may include interconnection or network interface controllers, components, or other suitable devices to communicate with one or more peripheral devices 504 or one or more databases 506 or other network elements via a network 508. For example, the communication resources 530 may include wired communication components (e.g., for coupling via USB, Ethernet, etc.), cellular communication components, NFC components, Bluetooth® (or Bluetooth® Low Energy) components, Wi-Fi® components, and other communication components.

Instructions 550 may comprise software, a program, an application, an applet, an app, or other executable code for causing at least any of the processors 510 to perform any one or more of the methodologies discussed herein. The instructions 550 may reside, completely or partially, within at least one of the processors 510 (e.g., within the processor's cache memory), the memory/storage devices 520, or any suitable combination thereof. Furthermore, any portion of the instructions 550 may be transferred to the hardware resources 500 from any combination of the peripheral devices 504 or the databases 506. Accordingly, the memory of processors 510, the memory/storage devices 520, the peripheral devices 504, and the databases 506 are examples of computer-readable and machine-readable media.

Example Procedures

Figure 6:
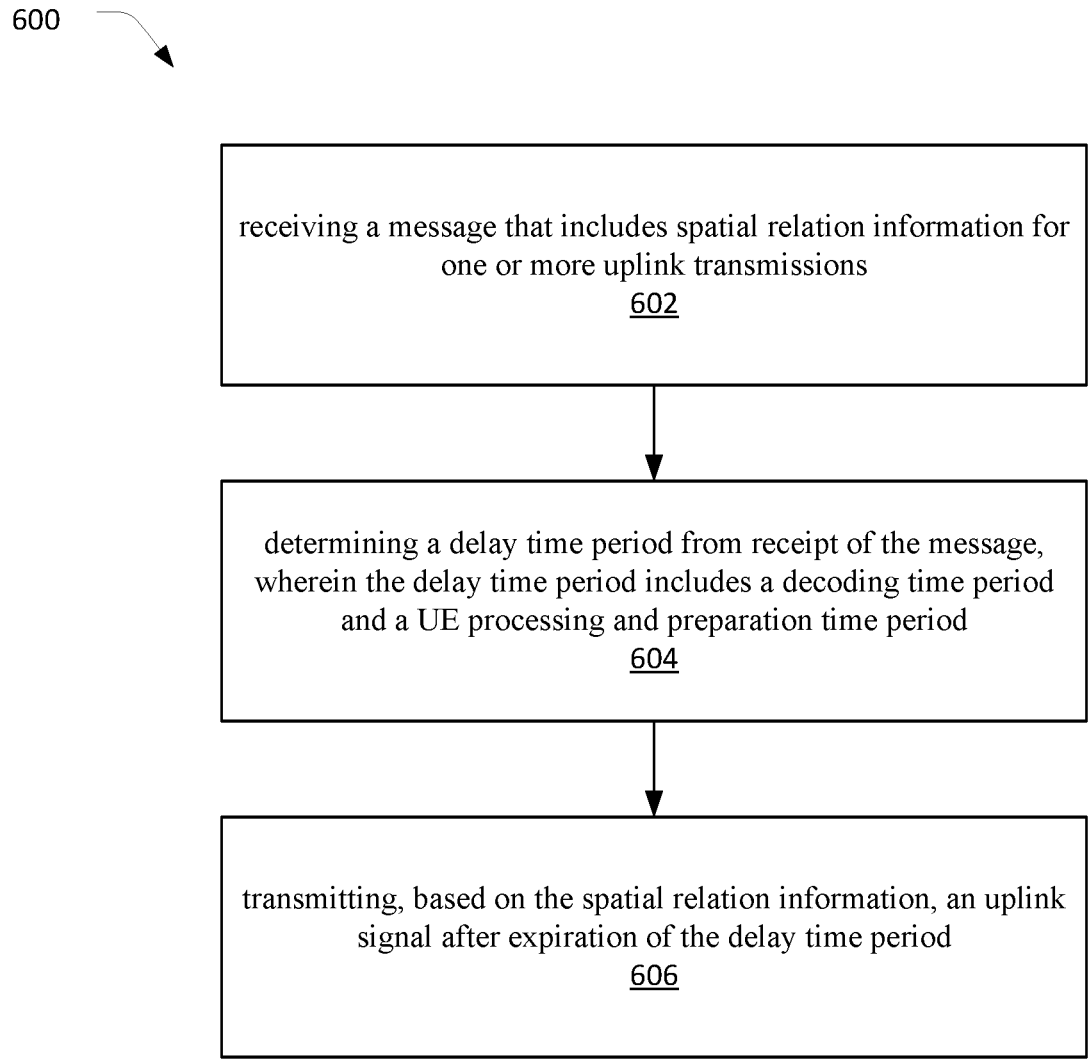
FIG. 6 is a flowchart of an example process that may be performed by a UE, in accordance with various embodiments.

In some embodiments, the electronic device(s), network(s), system(s), chip(s) or component(s), or portions or implementations thereof, of FIGS. 3-5, or some other figure herein, may be configured to perform one or more processes, techniques, or methods as described herein, or portions thereof. One such process 600 is depicted in FIG. 6. In some embodiments, the process 600 may be performed by a UE (e.g., UE 302 and/or 402) or a portion thereof.

For example, the process 600 may include, at 602, receiving a message that includes spatial relation information for one or more uplink transmissions. The message may be, for example, an RRC message or a MAC CE. In embodiments, the message may be received in a PDSCH. The spatial information may indicate that spatial information associated with a downlink reference signal and/or a SRS is to be used for the one or more uplink transmissions.

At 604, the process 600 may further include determining a delay time period from receipt of the message, wherein the delay time period includes a decoding time period and a UE processing and preparation time period.

At 606, the process 600 may further include transmitting, based on the spatial relation information, an uplink signal after expiration of the delay time period. The uplink signal may include, for example, a PUCCH, a PUSCH, or a SRS.

In some embodiments, the UE may transmit another uplink signal using prior spatial information during the delay time period (e.g., during the decoding time period). In other embodiments, the UE may be restricted from being scheduled for an uplink transmission during all or part of the delay period (e.g., the entire delay period or the UE processing and preparation time).

Figure 7:
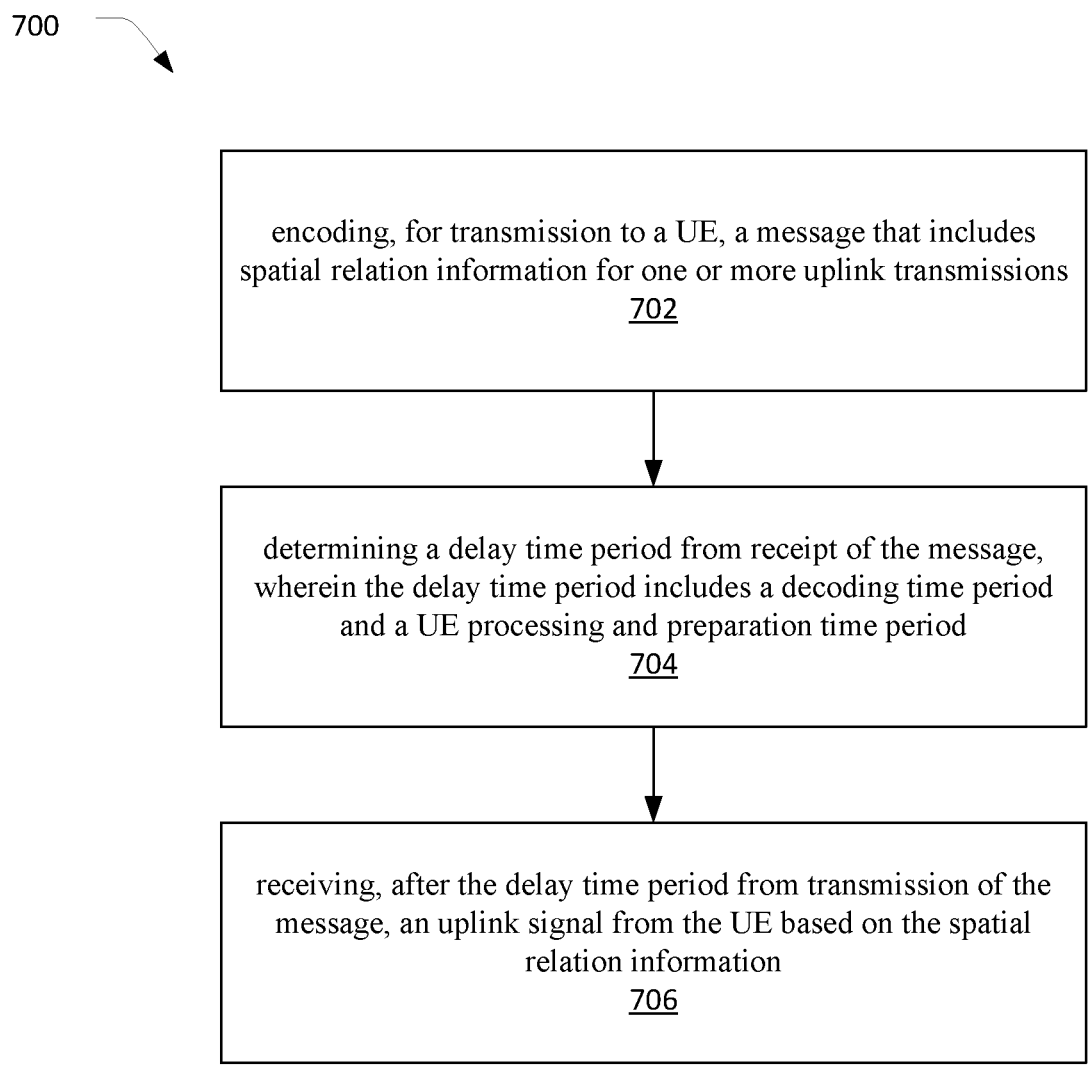
FIG. 7 is a flowchart of an example process that may be performed by an access node, such as a next generation Node B (gNB), in accordance with various embodiments.

FIG. 7 illustrates another process 700 in accordance with various embodiments. In some embodiments, the process 700 may be performed by an access node (e.g., AN 308 and/or 404) or a portion thereof.

For example, the process 700 may include, at 702, encoding, for transmission to a user equipment (UE), a message that includes spatial relation information for one or more uplink transmissions. The message may be, for example, an RRC message or a MAC CE. In embodiments, the message may be received in a PDSCH. The spatial information may indicate that spatial information associated with a downlink reference signal and/or a SRS is to be used for the one or more uplink transmissions.

At 704, the process 700 may further include determining a delay time period from receipt of the message, wherein the delay time period includes a decoding time period and a UE processing and preparation time period.

At 706, the process 700 may further include receiving, after the delay time period from transmission of the message, an uplink signal from the UE based on the spatial relation information. The uplink signal may include, for example, a PUCCH, a PUSCH, or a SRS.

In some embodiments, the gNB may schedule the UE to transmit another uplink signal using prior spatial information during the delay time period (e.g., during the decoding time period). In other embodiments, the UE may be restricted from being scheduled for an uplink transmission during all or part of the delay time period (e.g., the entire delay period or the UE processing and preparation time). Accordingly, the gNB may determine to refrain from scheduling an uplink transmission for the UE during all or part of the delay time period.

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

EXAMPLES

Example 1 may include a method comprising:
receiving a message that includes spatial relation information for one or more uplink transmissions;
determining a delay time period from receipt of the message, wherein the delay time period includes a decoding time period and a user equipment (UE) processing and preparation time period; and
transmitting, based on the spatial relation information, an uplink signal after expiration of the delay time period.

Example 2 may include the method of example 1 or some other example herein, wherein the uplink signal is a first uplink signal, and wherein the method further comprises transmitting a second uplink signal before expiration of the decoding time period based on prior spatial relation information.

Example 3 may include the method of example 1-2 or some other example herein, wherein the message is a radio resource control (RRC) message, and wherein the decoding time period includes an RRC decoding time.

Example 4 may include the method of example 1-2 or some other example herein, wherein the message is a medium access control (MAC) control element (CE), and wherein the decoding time period includes a MAC CE decoding time.

Example 5 may include the method of example 1-4 or some other example herein, wherein the spatial relation information indicates that spatial information associated with a downlink reference signal is to be used for the transmission of the uplink signal.

Example 6 may include the method of example 5 or some other example herein, further comprising determining a transmission configuration indicator (TCI) state of the downlink reference signal; and determining a spatial filter used for receiving the downlink reference signal based on the TCI state; wherein the uplink signal is transmitted using the determined spatial filter.

Example 7 may include the method of example 1-4 or some other example herein, wherein the spatial relation information indicates that spatial information associated with a sounding reference signal is to be used for the transmission of the uplink signal.

Example 8 may include the method of example 1-7 or some other example herein, wherein the uplink signal is a physical uplink control channel (PUCCH).

Example 9 may include the method of example 1-7 or some other example herein, wherein the uplink signal is a sounding reference signal (SRS).

Example 10 may include the method of example 1-9 or some other example herein, wherein the UE processing and preparation time period includes time for receive beam tracking and time tracking.

Example 11 may include the method of example 10 or some other example herein, wherein the UE processing and preparation time period is based on a TCI state of a downlink reference signal indicated by the spatial relation information.

Example 12 may include the method of example 1-11 or some other example herein, wherein the method is performed by a UE or a portion thereof.

Example 13 may include a method comprising:
encoding, for transmission to a user equipment (UE), a message that includes spatial relation information for one or more uplink transmissions;
determining a delay time period, wherein the delay time period includes a decoding time period and a UE processing and preparation time period; and
receiving, after the delay time period from transmission of the message, an uplink signal from the UE based on the spatial relation information.

Example 14 may include the method of example 13 or some other example herein, wherein the uplink signal is a first uplink signal, and wherein the method further comprises receiving a second uplink signal before expiration of the decoding time period based on prior spatial relation information.

Example 15 may include the method of example 13-14 or some other example herein, wherein the message is a radio resource control (RRC) message, and wherein the decoding time period includes an RRC decoding time.

Example 16 may include the method of example 13-14 or some other example herein, wherein the message is a medium access control (MAC) control element (CE), and wherein the decoding time period includes a MAC CE decoding time.

Example 17 may include the method of example 13-16 or some other example herein, wherein the spatial relation information indicates that spatial information associated with a downlink reference signal is to be used for the uplink transmissions.

Example 18 may include the method of example 17 or some other example herein, further comprising determining a TCI state of the downlink reference signal; and determining a spatial filter used for transmitting the downlink reference signal based on the TCI state; wherein the uplink signal is received using the determined spatial filter.

Example 19 may include the method of example 13-16 or some other example herein, wherein the spatial relation information indicates that spatial information associated with a sounding reference signal is to be used for the uplink transmissions.

Example 20 may include the method of example 13-19 or some other example herein, wherein the uplink signal is a PUCCH.

Example 21 may include the method of example 13-19 or some other example herein, wherein the uplink signal is a SRS.

Example 22 may include the method of example 13-21 or some other example herein, wherein the UE processing and preparation time period includes time for receive beam tracking and time tracking.

Example 23 may include the method of example 22 or some other example herein, wherein the UE processing and preparation time period is based on a TCI state of a downlink reference signal indicated by the spatial relation information.

Example 24 may include the method of example 13-23 or some other example herein, wherein the method is performed by a next generation Node B (gNB) or a portion thereof.

Example 25 may include an apparatus to be implemented in a next generation Node B (gNB), the apparatus comprising processing circuitry to: encode, for transmission to a user equipment (UE), a radio resource control (RRC) message that includes spatial relation information for one or more uplink transmissions; determine a delay time period, wherein the delay time period includes a decoding time period and a UE processing and preparation time period; determine to refrain from scheduling an uplink signal for the UE during the delay time period; and schedule the UE for transmission of an uplink signal using the spatial relation information after the delay time period. The apparatus may further include a memory to store the spatial relation information.

Example 26 may include the apparatus of example 25 or some other example herein, wherein the spatial relation information indicates that spatial information associated with a downlink reference signal or a sounding reference signal (SRS) is to be used for the one or more uplink transmissions.

Example 27 may include the apparatus of example 25-26 or some other example herein, wherein the UE processing and preparation time period includes time for receive beam tracking and time tracking based on a transmission configuration indicator (TCI) state of a downlink reference signal indicated by the spatial relation information.

Example 28 may include an apparatus comprising means to perform one or more elements of a method described in or related to any of examples 1-27, or any other method or process described herein.

Example 29 may include one or more non-transitory computer-readable media comprising instructions to cause an electronic device, upon execution of the instructions by one or more processors of the electronic device, to perform one or more elements of a method described in or related to any of examples 1-27, or any other method or process described herein.

Example 30 may include an apparatus comprising logic, modules, or circuitry to perform one or more elements of a method described in or related to any of examples 1-27, or any other method or process described herein.

Example 31 may include a method, technique, or process as described in or related to any of examples 1-27, or portions or parts thereof.

Example 32 may include an apparatus comprising: one or more processors and one or more computer-readable media comprising instructions that, when executed by the one or more processors, cause the one or more processors to perform the method, techniques, or process as described in or related to any of examples 1-27, or portions thereof.

Example 33 may include a signal as described in or related to any of examples 1-27, or portions or parts thereof.

Example 34 may include a datagram, packet, frame, segment, protocol data unit (PDU), or message as described in or related to any of examples 1-27, or portions or parts thereof, or otherwise described in the present disclosure.

Example 35 may include a signal encoded with data as described in or related to any of examples 1-27, or portions or parts thereof, or otherwise described in the present disclosure.

Example 36 may include a signal encoded with a datagram, packet, frame, segment, protocol data unit (PDU), or message as described in or related to any of examples 1-27, or portions or parts thereof, or otherwise described in the present disclosure.

Example 37 may include an electromagnetic signal carrying computer-readable instructions, wherein execution of the computer-readable instructions by one or more processors is to cause the one or more processors to perform the method, techniques, or process as described in or related to any of examples 1-27, or portions thereof.

Example 38 may include a computer program comprising instructions, wherein execution of the program by a processing element is to cause the processing element to carry out the method, techniques, or process as described in or related to any of examples 1-27, or portions thereof.

Example 39 may include a signal in a wireless network as shown and described herein.

Example 40 may include a method of communicating in a wireless network as shown and described herein.

Example 41 may include a system for providing wireless communication as shown and described herein.

Example 42 may include a device for providing wireless communication as shown and described herein.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Terminology

For the purposes of the present document, the following terms and definitions are applicable to the examples and embodiments discussed herein.

The term "circuitry" as used herein refers to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable SoC), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, and/or transferring digital data. Processing circuitry may include one or more processing cores to execute instructions and one or more memory structures to store program and data information. The term "processor circuitry" may refer to one or more application processors, one or more baseband processors, a physical central processing unit (CPU), a single-core processor, a dual-core processor, a triple-core processor, a quad-core processor, and/or any other device capable of executing or otherwise operating computer-executable instructions, such as program code, software modules, and/or functional processes. Processing circuitry may include more hardware accelerators, which may be microprocessors, programmable processing devices, or the like. The one or more hardware accelerators may include, for example, computer vision (CV) and/or deep learning (DL) accelerators. The terms "application circuitry" and/or "baseband circuitry" may be considered synonymous to, and may be referred to as, "processor circuitry."

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, network interface cards, and/or the like.

The term "user equipment" or "UE" as used herein refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface.

The term "network element" as used herein refers to physical or virtualized equipment and/or infrastructure used to provide wired or wireless communication network services. The term "network element" may be considered synonymous to and/or referred to as a networked computer, networking hardware, network equipment, network node, router, switch, hub, bridge, radio network controller, RAN device, RAN node, gateway, server, virtualized VNF, NFVI, and/or the like.

The term "computer system" as used herein refers to any type interconnected electronic devices, computer devices, or components thereof. Additionally, the term "computer system" and/or "system" may refer to various components of a computer that are communicatively coupled with one another. Furthermore, the term "computer system" and/or "system" may refer to multiple computer devices and/or multiple computing systems that are communicatively coupled with one another and configured to share computing and/or networking resources.

The term "appliance," "computer appliance," or the like, as used herein refers to a computer device or computer system with program code (e.g., software or firmware) that is specifically designed to provide a specific computing resource. A "virtual appliance" is a virtual machine image to be implemented by a hypervisor-equipped device that virtualizes or emulates a computer appliance or otherwise is dedicated to provide a specific computing resource.

The term "resource" as used herein refers to a physical or virtual device, a physical or virtual component within a computing environment, and/or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, workload units, and/or the like. A "hardware resource" may refer to compute, storage, and/or network resources provided by physical hardware element(s). A "virtualized resource" may refer to compute, storage, and/or network resources provided by virtualization infrastructure to an application, device, system, etc. The term "network resource" or "communication resource" may refer to resources that are accessible by computer devices/systems via a communications network. The term "system resources" may refer to any kind of shared entities to provide services, and may include computing and/or network resources. System resources may be considered as a set of coherent functions, network data objects or services, accessible through a server where such system resources reside on a single host or multiple hosts and are clearly identifiable.

The term "channel" as used herein refers to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" as used herein refers to a connection between two devices through a RAT for the purpose of transmitting and receiving information.

The terms "instantiate," "instantiation," and the like as used herein refers to the creation of an instance. An "instance" also refers to a concrete occurrence of an object, which may occur, for example, during execution of program code.

The terms "coupled," "communicatively coupled," along with derivatives thereof are used herein. The term "coupled" may mean two or more elements are in direct physical or electrical contact with one another, may mean that two or more elements indirectly contact each other but still cooperate or interact with each other, and/or may mean that one or more other elements are coupled or connected between the elements that are said to be coupled with each other. The term "directly coupled" may mean that two or more elements are in direct contact with one another. The term "communicatively coupled" may mean that two or more elements may be in contact with one another by a means of communication including through a wire or other interconnect connection, through a wireless communication channel or link, and/or the like.

The term "information element" refers to a structural element containing one or more fields. The term "field" refers to individual contents of an information element, or a data element that contains content.

The term "SMTC" refers to an SSB-based measurement timing configuration configured by SSB-MeasurementTimingConfiguration.

The term "SSB" refers to an SS/PBCH block.

The term "a "Primary Cell" refers to the MCG cell, operating on the primary frequency, in which the UE either performs the initial connection establishment procedure or initiates the connection re-establishment procedure.

The term "Primary SCG Cell" refers to the SCG cell in which the UE performs random access when performing the Reconfiguration with Sync procedure for DC operation.

The term "Secondary Cell" refers to a cell providing additional radio resources on top of a Special Cell for a UE configured with CA.

The term "Secondary Cell Group" refers to the subset of serving cells comprising the PSCell and zero or more secondary cells for a UE configured with DC.

The term "Serving Cell" refers to the primary cell for a UE in RRC_CONNECTED not configured with CA/DC there is only one serving cell comprising of the primary cell.

The term "serving cell" or "serving cells" refers to the set of cells comprising the Special Cell(s) and all secondary cells for a UE in RRC_CONNECTED configured with CA/.

The term "Special Cell" refers to the PCell of the MCG or the PSCell of the SCG for DC operation; otherwise, the term "Special Cell" refers to the Pcell.

The invention claimed is:

1. One or more non-transitory computer-readable media (NTCRM) having instructions, stored thereon, that when executed by one or more processors cause a user equipment (UE) to:
   receive a message that includes spatial relation information for one or more uplink transmissions;
   determine a delay time period from receipt of the message, wherein the delay time period includes a decoding time period and a UE processing and preparation time period;
   transmit, based on the spatial relation information, a first uplink signal after expiration of the delay time period; and
   transmit a second uplink signal before expiration of the decoding time period based on prior spatial relation information.

2. The one or more NTCRM of claim 1, wherein the message is a radio resource control (RRC) message, and wherein the decoding time period includes an RRC decoding time.

3. The one or more NTCRM of claim 1, wherein the message is a medium access control (MAC) control element (CE), and wherein the decoding time period includes a MAC CE decoding time.

4. The one or more NTCRM of claim 1, wherein the spatial relation information indicates that spatial information associated with a downlink reference signal or a sounding reference signal (SRS) is to be used for the transmission of the first uplink signal.

5. The one or more NTCRM of claim 4, wherein the spatial relation information indicates that the spatial information associated with the downlink reference signal is to be used for the transmission of the first uplink signal, and wherein the instructions, when executed, are further to cause the UE to:
   determine a transmission configuration indicator (TCI) state of the downlink reference signal; and
   determine a spatial filter used for receiving the downlink reference signal based on the TCI state, wherein the first uplink signal is transmitted using the determined spatial filter.

6. The one or more NTCRM of claim 1, wherein the first uplink signal is a physical uplink control channel (PUCCH) or a sounding reference signal (SRS).

7. The one or more NTCRM of claim 1, wherein the UE processing and preparation time period includes time for receive beam tracking and time tracking.

8. The one or more NTCRM of claim 7, wherein the UE processing and preparation time period is based on a transmission configuration indicator state of a downlink reference signal indicated by the spatial relation information.

9. One or more non-transitory computer-readable media (NTCRM) having instructions, stored thereon, that when executed by one or more processors cause a next generation Node B (gNB) to:
    encode, for transmission to a user equipment (UE), a message that includes spatial relation information for one or more uplink transmissions;
    determine a delay time period, wherein the delay time period includes a decoding time period and a UE processing and preparation time period;
    receive, after the delay time period from the transmission of the message, a first uplink signal from the UE based on the spatial relation information; and
    receive a second uplink signal before expiration of the decoding time period based on prior spatial relation information.

10. The one or more NTCRM of claim 9, wherein the message is a radio resource control (RRC) message, and wherein the decoding time period includes an RRC decoding time; or
    wherein the message is a medium access control (MAC) control element (CE), and wherein the decoding time period includes a MAC CE decoding time.

11. The one or more NTCRM of claim 9, wherein the spatial relation information indicates that spatial information associated with a downlink reference signal or a sounding reference signal (SRS) is to be used for the one or more uplink transmissions.

12. The one or more NTCRM of claim 11, wherein the spatial relation information indicates that the spatial information associated with the downlink reference signal is to be used for the one or more uplink transmissions, and wherein the instructions, when executed, are further to cause the gNB to:
    determine a transmission configuration indicator (TCI) state of the downlink reference signal; and
    determine a spatial filter used for transmitting the downlink reference signal based on the TCI state, wherein the first uplink signal is received using the determined spatial filter.

13. The one or more NTCRM of claim 9, wherein the first uplink signal is a physical uplink control channel (PUCCH) or a sounding reference signal (SRS).

14. The one or more NTCRM of claim 9, wherein the UE processing and preparation time period includes time for receive beam tracking and time tracking.

15. The one or more NTCRM of claim 14, wherein the UE processing and preparation time period is based on a transmission configuration indicator state of a downlink reference signal indicated by the spatial relation information.

16. An apparatus to be implemented in a next generation Node B (gNB), the apparatus comprising:
    processing circuitry to:
        encode, for transmission to a user equipment (UE), a radio resource control (RRC) message that includes spatial relation information for one or more uplink transmissions;
        determine a delay time period, wherein the delay time period includes a decoding time period and a UE processing and preparation time period;
        determine to refrain from scheduling an uplink signal for the UE during the delay time period; and
        schedule the UE for transmission of an uplink signal using the spatial relation information after the delay time period; and
    a memory to store the spatial relation information.

17. The apparatus of claim 16, wherein the spatial relation information indicates that spatial information associated with a downlink reference signal or a sounding reference signal (SRS) is to be used for the one or more uplink transmissions.

18. The apparatus of claim 16, wherein the UE processing and preparation time period includes time for receive beam tracking and time tracking based on a transmission configuration indicator (TCI) state of a downlink reference signal indicated by the spatial relation information.

* * * * *